United States Patent
Terada

(10) Patent No.: US 11,137,768 B2
(45) Date of Patent: Oct. 5, 2021

(54) POSITION ESTIMATION SYSTEM, POSITION DETECTION METHOD, AND PROGRAM

(71) Applicant: TOYOTA JIDOSHA KABUSHIKI KAISHA, Toyota (JP)

(72) Inventor: Koji Terada, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 259 days.

(21) Appl. No.: 16/263,005

(22) Filed: Jan. 31, 2019

(65) Prior Publication Data

US 2019/0286159 A1 Sep. 19, 2019

(30) Foreign Application Priority Data

Mar. 14, 2018 (JP) .............................. JP2018-046622

(51) Int. Cl.
G05D 1/02 (2020.01)
(52) U.S. Cl.
CPC ......... G05D 1/0268 (2013.01); G05D 1/0231 (2013.01); G05D 2201/02 (2013.01)
(58) Field of Classification Search
CPC . G05D 1/0268; G05D 1/0231; G05D 2201/02
See application file for complete search history.

(56) References Cited

U.S. PATENT DOCUMENTS 5,629,478 A * 5/1997 Nakajima ............. B60C 23/061
340/444
2007/0118248 A1 5/2007 Lee et al.
2016/0054471 A1 * 2/2016 Frelich ................. E01C 19/26
702/5
2017/0122739 A1 * 5/2017 Kurashina .......... G01C 19/5776

FOREIGN PATENT DOCUMENTS

| JP | 2002318274 A | * | 10/2002 |
| JP | 2007-149088 | | 6/2007 |
| JP | 2012-128781 | | 7/2012 |
| JP | 2016-224680 | | 12/2016 |

OTHER PUBLICATIONS

Foreign Document Translated (attached).*

* cited by examiner

Primary Examiner — Rami Khatib
Assistant Examiner — Shahira Baajour
(74) Attorney, Agent, or Firm — Oblon, McClelland, Maier & Neustadt, L.L.P.

(57) ABSTRACT

A position estimation system and the like that prevent accuracy of self-position information from decreasing is provided. A position estimation system 100 according to the present disclosure includes a first sensor configured to output first data including data of an angular velocity of a wheel driven when a moving apparatus 10 moves. The position estimation system further includes a second sensor configured to output second data including position data of the moving apparatus 10 detected not according to the angular velocity of the wheel or data concerning a change in a posture of the moving apparatus 10. The position estimation system further includes a self-position estimation unit configured to set a priority of the first data according to a value of the angular velocity of the wheel and integrate the first data with the second data based on the set priority to estimate a position of the moving apparatus 10.

7 Claims, 5 Drawing Sheets

POSITION ESTIMATION SYSTEM, POSITION DETECTION METHOD, AND PROGRAM

CROSS REFERENCE TO RELATED APPLICATIONS

This application is based upon and claims the benefit of priority from Japanese patent application No. 2018-046622, filed on Mar. 14, 2018, the disclosure of which is incorporated herein in its entirety by reference.

BACKGROUND

The present disclosure relates to a position estimation system, a position detection method, and a program.

In various moving apparatuses, techniques for estimating positions of moving apparatuses are known. For example, sensor fusion, which is a method of processing data acquired from a plurality of sensors in an integrated manner, can generate highly accurate information that cannot be acquired from a single sensor.

For example, Japanese Unexamined Patent Application Publication No. 2016-224680 proposes a technique using the sensor fusion. A self-position estimation apparatus uses a weighted average value calculated using a first self-position and a second self-position as a last self-position in a current step. A weighting coefficient used for estimating the last self-position of the moving apparatus is a function of an abnormality occurrence probability. The abnormality occurrence probability is calculated from an abnormality occurrence probability calculation formula. The abnormality occurrence probability calculation formula is obtained by machine learning learnt data acquired by the moving apparatus learning while moving.

SUMMARY

By the way, slippage may occur between a wheel and an installed surface of a moving apparatus having the wheel as means for moving. When slippage occurs between the wheel and the installed surface, a rotation amount of the wheel detected by a sensor for detecting the driving of the wheel may not match an actual movement amount of the moving apparatus in some cases. In such a case, when the rotation amount of the wheel is used for the sensor fusion, the accuracy of the self-position estimation apparatus may decrease. In order to address this problem, a technique for effectively preventing accuracy of self-position information from decreasing while using data detecting a movement of each driving unit has been desired.

The present disclosure has been made to solve such a problem. An object of the present disclosure is to provide a position estimation system and the like that effectively prevent accuracy of self-position information from decreasing.

A position estimation system according to the present disclosure includes a first sensor configured to output first data including data of an angular velocity of a wheel driven when a moving apparatus moves. The position estimation system further includes a second sensor configured to output second data including position data of the moving apparatus detected not according to the angular velocity of the wheel or data concerning a change in a posture of the moving apparatus. The position estimation system further includes a self-position estimation unit configured to set a priority of the first data according to a value of the angular velocity of the wheel and integrate the first data with the second data based on the set priority to estimate a position of the moving apparatus. The position estimation system further includes a data output unit configured to output data related to the estimated position of the moving apparatus.

With such a configuration, for example, when relatively large slippage is occurring between the driving wheel and the floor surface, the position estimation system can set the priority of the data acquired from this driving wheel relatively low.

A position estimation method according to the present disclosure includes outputting first data including data of an angular velocity of a wheel driven when a moving apparatus moves. The position estimation method further includes outputting second data including position data of the moving apparatus detected not according to the angular velocity of the wheel or data concerning a change in a posture of the moving apparatus. The position estimation method further includes setting a priority of the first data according to a value of the angular velocity of the wheel. The position estimation method further includes integrating the first data with the second data based on the set priority to estimate a position of the moving apparatus. The position estimation method further includes outputting data related to the estimated position of the moving apparatus.

With such a configuration, for example, when relatively large slippage is occurring between the driving wheel and the floor surface, the position estimation method can set the priority of the data acquired from this driving wheel relatively low.

A method executed by a computer caused by a program according to the present disclosure includes outputting first data including data of an angular velocity of a wheel driven when a moving apparatus moves. The position estimation method further includes outputting second data including position data of the moving apparatus detected not according to the angular velocity of the wheel or data concerning a change in a posture of the moving apparatus. The position estimation method further includes setting a priority of the first data according to a value of the angular velocity of the wheel. The position estimation method further includes integrating the first data with the second data based on the set priority to estimate a position of the moving apparatus. The position estimation method further includes outputting data related to the estimated position of the moving apparatus.

With such a configuration, for example, when relatively large slippage is occurring between the driving wheel and the floor surface, the method executed by a computer caused by a program can set the priority of the data acquired from this driving wheel relatively low.

According to the present disclosure, it is possible to provide a position estimation system and the like that effectively prevent accuracy of self-position information from decreasing.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
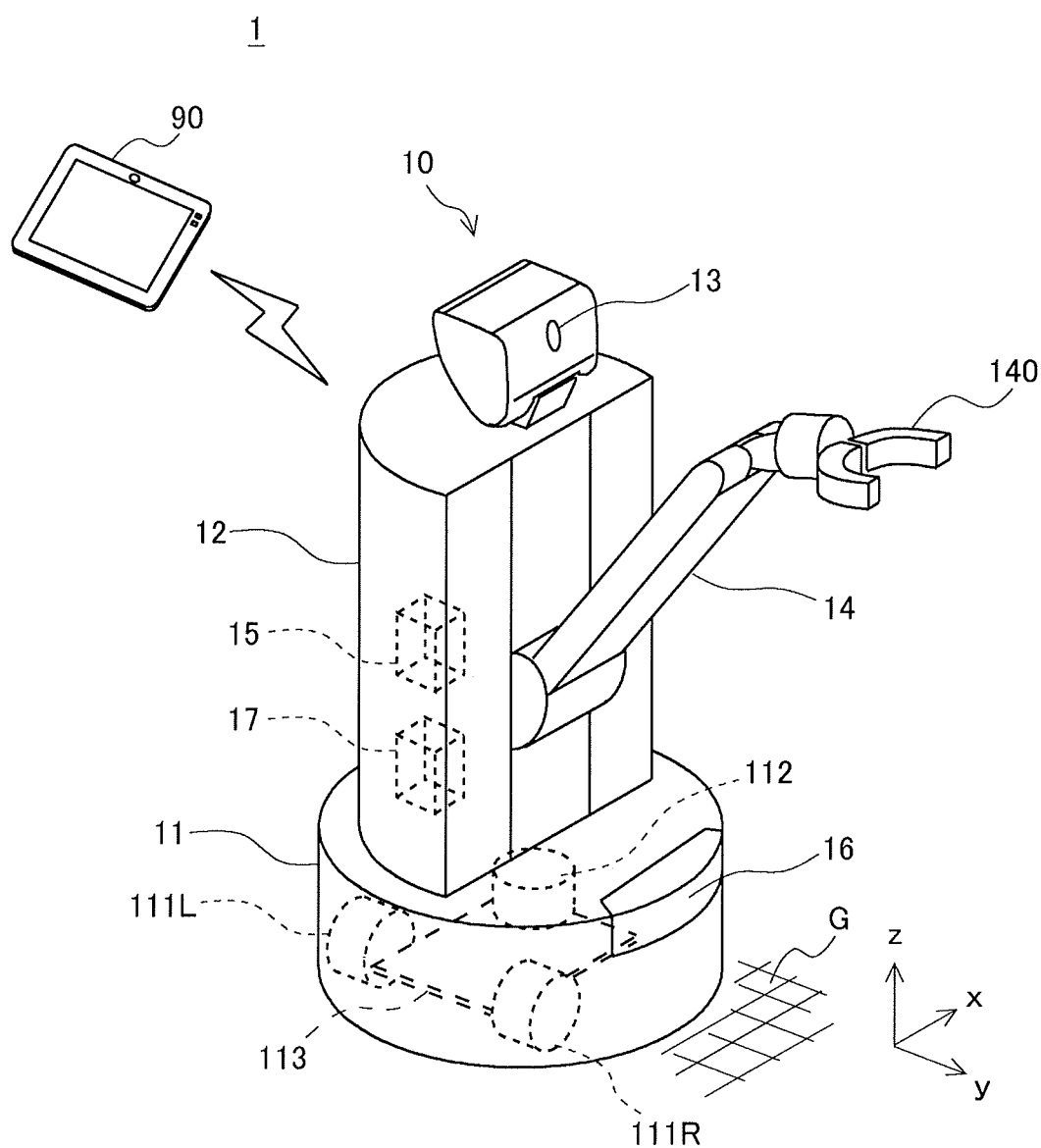
FIG. 1 is a configuration diagram showing a schematic configuration of a moving system according to an embodiment.

For the clarification of the description, the following description and the drawings may be omitted or simplified as appropriate. Further, each element shown in the drawings as functional blocks that perform various processing can be formed of a CPU (Central Processing Unit), a memory, and other circuits in hardware and may be implemented by programs loaded into the memory in software. Those skilled in the art will therefore understand that these functional blocks may be implemented in various ways by only hardware, only software, or the combination thereof without any limitation. Therefore, a component illustrated as a circuit in the following descriptions can be achieved by either hardware or software or both of them, and a component shown as a circuit for achieving a certain function could be indicated as a part of software for achieving a function similar to the function. For example, a component described as a control circuit could be described as a control unit. Throughout the drawings, the same components are denoted by the same reference signs and overlapping descriptions will be omitted as appropriate.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

EMBODIMENT

Hereinafter, an embodiment of the present disclosure will be described with reference to the drawings. In FIG. 1, a left-handed orthogonal coordinate system is given. In FIG. 1, an x-axis and a y-axis are parallel to a floor surface G. A z-axis is perpendicular to the floor surface G. The orthogonal coordinate system shown in FIG. 1 and the orthogonal coordinate system shown in FIG. 2 indicate the same directions.

FIG. 1 is a configuration diagram showing a schematic configuration of a moving system according to an embodiment. The moving system 1 shown in FIG. 1 includes a moving apparatus 10 and an operation apparatus 90 in its configuration.

The operation apparatus 90 has a function for operating the moving apparatus 10. The operation apparatus 90 is, for example, a tablet terminal, a smartphone, and a personal computer. The operation apparatus 90 is communicably connected to the moving apparatus 10, and receives various information from the moving apparatus 10. The operation apparatus 90 further includes, for example, a display unit for notifying a user of a state of the moving apparatus 10, an input unit for the user to instruct the moving apparatus 10 to operate, and a communication control unit for transmitting and receiving information to and from the moving apparatus 10.

The moving apparatus 10 is communicably connected to the operation apparatus 90, and moves on the floor surface G in response to an instruction from the operation apparatus 90.

The moving apparatus 10 mainly includes a carriage 11 and a main body part 12. The carriage 11 is in contact with the floor surface G and supports the main body part 12. The main body part 12 mainly includes an image sensor 13, a robot arm 14, a gyro sensor 15, a laser range sensor 16, and a robot control apparatus 17. Each component will be described in detail below.

The carriage 11 is an omniorientation carriage having a function of moving on the floor surface G and a function of changing a posture of the moving apparatus 10. The omniorientation carriage may be referred to as an omnidirectional carriage, an omniorientation moving carriage, or an omnidirectional moving carriage. The carriage 11 includes a driving wheel 111L, a driving wheel 111R, a turn axis 112, and a frame 113 as main components. The carriage 11 is configured to be capable of moving the main body part 12 in a specified direction. That is, the driving wheel 111L, the driving wheel 111R, and the turn axis 112 of the carriage 11 are configured to be independently driven.

The driving wheels 111L and 111R are wheels that are brought into contact with the floor surface G. The driving wheel 111L and the driving wheel 111R are spaced coaxially from each other and can be driven independently from each other. Each of the driving wheel 111L and the driving wheel 111R has an actuator for rotating the wheel. Thus, when the driving wheel 111L and the driving wheel 111R rotate synchronously in the same direction, the carriage 11 travels straight. When a rotation speed or a rotation direction of the driving wheel 111L differs from a rotation speed or a rotation direction of the driving wheel 111R, respectively, the carriage 11 travels while turning according to the difference or turns without moving. The driving wheel 111L and the driving wheel 111R are supported by the frame 113. The carriage 11 includes non-driven wheels (not shown). The non-driven wheels support the carriage 11 on the floor surface G and follow the driving wheel 111L and the driving wheel 111R, respectively.

The turn axis 112 has a function of turning the moving apparatus 10. The turn axis 112 is provided on the frame 113 and includes a rotating axis along a z-axis direction perpendicular to the floor surface G. The turn axis 112 also includes an actuator for rotating the turn axis 112. Thus, when the turn axis 112 rotates, the moving apparatus 10 changes the posture about the turn axis 112.

Each of the driving wheel 111L, the driving wheel 111R, and the turn axis 112 has a rotation sensor for detecting the rotation of the axis. When the rotation sensor detects the rotation of the axis, an angular velocity of the axis can be obtained. The rotation sensor may have a function of calculating the angular velocity based on detected data. The rotation sensor is, for example, an optical or magnetic rotary encoder. Each of the rotation sensors is connected to the control apparatus 17, and supplies a detected value to the control apparatus 17.

The image sensor 13 captures an image including the robot arm 14 of the main body part. Data of the image captured by the image sensor 13 is used to recognize objects around the moving apparatus 10. The data of the image captured by the image sensor 13 is used for controlling the robot arm 14.

The robot arm 14 is an articulated arm provided on the main body part 12. The robot arm 14 extends from the main body part 12 and includes a robot hand 140 at its distal end. Each of the robot arm 14 and the robot hand 140 includes an actuator in its joint part and can perform an operation of grasping or releasing an object according to an instruction received from the operation apparatus 90.

The gyro sensor 15 has a function of detecting a change in the movement and posture of the moving apparatus 10. The gyro sensor 15 detects, for example, acceleration in each axis direction of orthogonal three-axis coordinates and an angular velocity around each axis.

The laser range sensor 16 detects a distance to a surrounding object by irradiating a laser beam and detecting reflected light of the irradiated laser beam.

The control apparatus 17 receives information from each component, processes the received information, and sends an instruction to each component as appropriate based on a result of the processing. The control apparatus 17 is composed of a substrate on which a plurality of semiconductors and the like are mounted. For example, the control apparatus 17 receives an instruction from the operation apparatus 90 and operates each component of the moving apparatus 10 based on the received instruction.

The control apparatus 17 can generate surrounding map information based on information and the like received from the image sensor 13 and the laser range sensor 16. Further, the control apparatus 17 receives information about a movement of the moving apparatus 10 and information about a posture change of the moving apparatus 10 from the rotation sensors included in the image sensor 13, the gyro sensor 15, the laser range sensor 16, and the carriage 11. Then, the control apparatus 17 estimates the position of the moving apparatus 10 using the received information.

The moving apparatus 10 is instructed by the operation apparatus 90 to move to a destination and can perform an autonomous movement based on the received instruction. In this case, the control apparatus 17 synthesizes the generated surrounding map information and the estimated position of the moving apparatus 10, and generates a movement route to move to the destination while avoiding an obstacle etc. When the control apparatus 17 generates the movement route, it controls the carriage 11 to move according to the generated movement route. The control apparatus 17 sequentially updates the estimation of the position of the moving apparatus 10 based on the information received from each sensor while moving the carriage 11.

Figure 2:
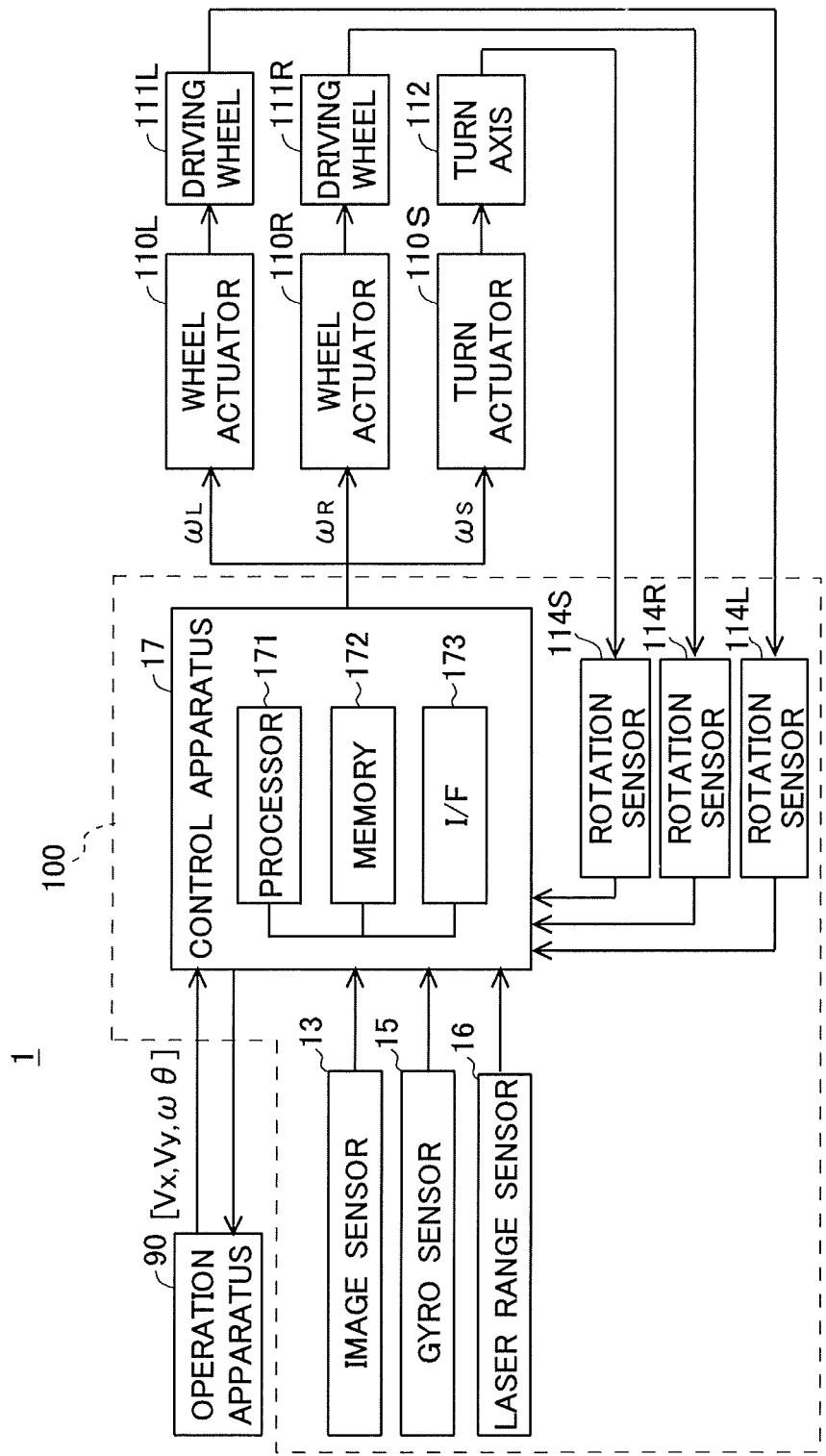
FIG. 2 is a hardware configuration diagram showing a main configuration of the moving system according to the embodiment.

Next, a configuration related to the movement of the moving apparatus 10 and a configuration of the system for detecting the position of the moving apparatus 10, which are main hardware configurations of the moving system 1, will be described with reference to FIG. 2. FIG. 2 is a hardware configuration diagram showing a main configuration of the moving system according to the embodiment.

For example, the operation apparatus 90 periodically generates velocities (Vx, Vy, θs) concerning a velocity command for the moving apparatus 10 to move from a current position to a target position. Here, Vx indicates a velocity in the x-axis direction and Vy indicates a velocity in the y-axis direction. The combination of Vx and Vy indicates a translational velocity. Further, θs indicates an angular velocity of the turn of the main body part 12. The operation apparatus 90 transmits the generated velocity command to the control apparatus 17.

The control apparatus 17 includes a processor 171, a memory 172, and an I/F 173 (I/F=Interface). The processor 171 is a control circuit including a CPU as a main component. The processor 171 exchanges signals with the outside of the control apparatus 17 via the I/F 173. Further, the processor 171 is connected to the memory 172, and stores signals in the memory 172 and reads the signals stored in the memory 172 as appropriate. The memory 172 is a volatile or non-volatile storage apparatus such as a flash memory, a DRAM (Dynamic Random Access Memory), and an SSD (Solid State Drive).

The control apparatus 17 generates signals for driving the driving wheel 111L, the driving wheel 111R, and the turn axis 112 based on the velocity command received from the operation apparatus 90. That is, the control apparatus 17 generates angular velocities (ωL, ωR, ωs) for controlling rotation of each actuator based on the received velocity command.

Figure 3:
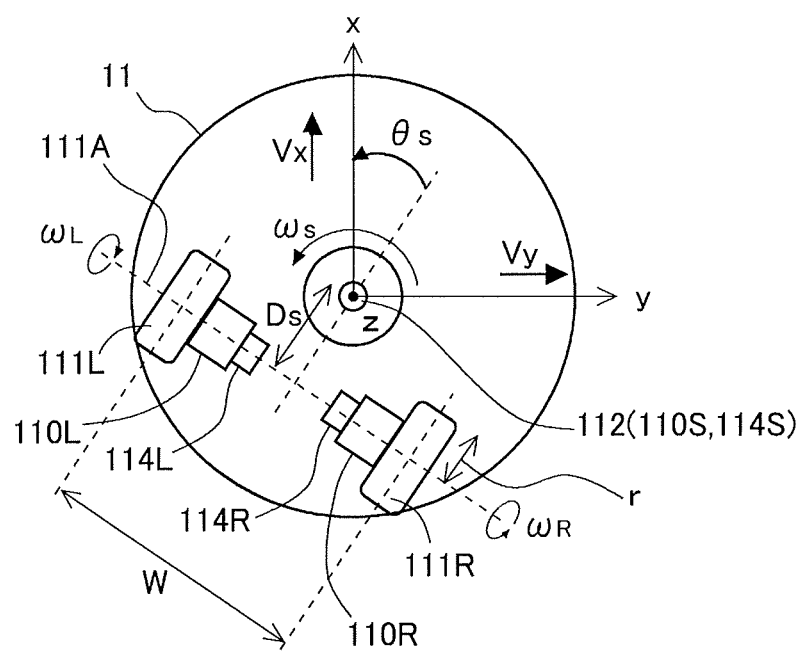
FIG. 3 is a view showing a main configuration of an omniorientation carriage according to the embodiment.

The signals generated by the control apparatus 17 to control rotation of each actuator will be described with reference to FIG. 3. FIG. 3 is a view showing a main configuration of the omniorientation carriage according to the embodiment. FIG. 3 schematically shows the main configuration by projecting the carriage 11 on a xy plane. To make descriptions easy to understand, the z-axis of the xyz left-handed orthogonal coordinate system shown in FIG. 3 matches the center of the turn axis.

A wheel actuator 110L is connected to the driving wheel 111L and rotates the driving wheel 111L. A rotation sensor 114L detects rotation of the driving wheel 111L. Likewise, a wheel actuator 110R is connected to the driving wheel 111R and rotates the driving wheel 111R. A rotation sensor 114R detects rotation of the driving wheel 111R. A turn actuator 110S is connected to the turn axis 112 and rotates the turn axis 112. A rotation sensor 114S detects the rotation of the turn axis 112.

Both of the radii of the wheels of the driving wheel 111L and the driving wheel 111R are a radius r. Further, the driving wheel 111L and the driving wheel 111R are disposed on a) wheel axis 111A. A distance between the center of the driving wheel 111L and the center of the driving wheel 111R is W. The turn axis 112 is provided substantially at the center of the carriage 11 and parallel to the z-axis. A distance from the center of the turn axis 112 to the wheel axis 111A is s.

With such a configuration, the relation between the velocities (Vx, Vy, θs) included in the velocity command generated by the operation apparatus 90 and the angular velocities (ωL, ωR, ωs) concerning rotational motions of the respective driving wheels and the turn axis 112 is as shown in the following equations (1) and (2).

[Equation 1]

$$J = \begin{bmatrix} \frac{r}{2}\cos\theta s - \frac{rDs}{W}\sin\theta s & \frac{r}{2}\cos\theta s + \frac{rDs}{W}\sin\theta s & 0 \\ \frac{r}{2}\sin\theta s + \frac{rDs}{W}\cos\theta s & \frac{r}{2}\sin\theta s - \frac{rDs}{W}\cos\theta s & 0 \\ \frac{r}{w} & -\frac{r}{w} & 1 \end{bmatrix} \quad (1)$$

-continued

[Equation 2]

$$\begin{bmatrix} \omega_R \\ \omega_L \\ \omega_s \end{bmatrix} = J^{-1} \begin{bmatrix} Vx \\ Vy \\ \theta s \end{bmatrix} \quad (2)$$

In these equations, J represents Jacobian and $J^{-1}$ represents an inverse matrix of J.

Returning to FIG. 2, the description will be continued. The control apparatus 17 calculates the angular velocities (ωL, ωR, ωs) of the respective driving wheels and the turn axis) 112 from the velocities (Vx, Vy, θs) concerning the velocity command received from the operation apparatus 90 according to the above equations (1) and (2). The control apparatus 17 transmits the generated angular velocity ωL to the wheel actuator 110L, transmits the angular velocity ωR to the wheel actuator 110L, and transmits the angular velocity ωs to the turn actuator 110S. The wheel actuator 110L, which has received the signal related to the angular velocity from the control apparatus 17, operates to rotate the connected driving wheel 111L at the angular velocity ωL. Likewise, the wheel actuator 110R, which has received the signal related to the angular velocity from the control apparatus 17, operates to rotate the driving wheel 111R at the angular velocity ωR. Likewise, the turn actuator 110S operates to rotate the turn axis 112 at the angular velocity ωs.

Next, a position estimation system included in the moving system 1 will be described. A position estimation system 100 is a system that detects the position of the moving apparatus 10 based on data acquired from various sensors.

The position estimation system 100 includes a sensor for detecting the angular velocities of the wheels of the carriage 11 included in the moving apparatus 10 and a sensor for detecting data concerning a position or posture change of the moving apparatus 10 not according to the angular velocities of the wheels of the carrier 11. The position estimation system 100 further includes calculation units that estimate the position of the moving apparatus 10 based on the data acquired from these sensors. The calculation unit has a function of setting a priority of the data acquired from the sensor according to the value of the angular velocity of the wheel included in the carriage 11.

The priority here means a priority level that gives a weighting when the position of the moving apparatus 10 is estimated by integrating a plurality of data pieces acquired from the plurality of sensors. That is, when the priority of the data acquired from a certain sensor is low, the weighting is set to become small in such a way that a contribution level of the data acquired from the sensor becomes relatively small. Alternatively, in such a case, the position of the moving apparatus 10 is estimated without using the data acquired from this sensor. On the other hand, when the priority of the data acquired from a certain sensor is high, the weighting is set to become large in such a way that the contribution level of the data acquired from the sensor becomes relatively large. In summary, different priorities are set to the data output from the sensors concerned according to whether the reliability of the data is relatively low or relatively high. The position of the moving apparatus 10 is estimated based on the set priorities.

For example, the driving wheel 111L and the driving wheel 111R of the carriage 11 move on the floor surface G using friction. In this case, when a friction coefficient is low, slippage occurs between the driving wheel and the floor surface G. When slippage occurs between the driving wheel and the floor surface G, the rotation amount of the driving wheel driven by the wheel actuator does not match a movement amount of the driving wheel actually moved. Thus, when the slippage is relatively large between the driving wheel and the floor surface G, the priority of the data acquired from the rotation sensor is set relatively low. When such a configuration in which the priority is set in a manner described above is employed, it is possible to effectively prevent the accuracy of the calculation for estimating the position of the moving apparatus 10 from decreasing.

Hereinafter, the position estimation system 100 will be described in more detail. The position estimation system 100 includes the image sensor 13, the gyro sensor 15, the laser range sensor 16, the rotation sensor 114L, the rotation sensor 114R, and the rotation sensor 114S. The position estimation system 100 further includes the control apparatus 17. The data detected by each sensor is supplied to the control apparatus 17. The control apparatus 17 integrates the data received from the respective sensors to estimate the position of the moving apparatus 10. Then, the control apparatus 17 outputs data related to the estimated position of the moving apparatus 10 to the operation apparatus 90.

Next, functions of the position estimation system 100 will be further described with reference to FIG. 4. The position estimation system 100 according to the embodiment has a function of estimating the position of the moving apparatus 10 based on the data received from the plurality of sensors and outputting the data related to the estimated position to a route calculation unit 186.

Figure 4:
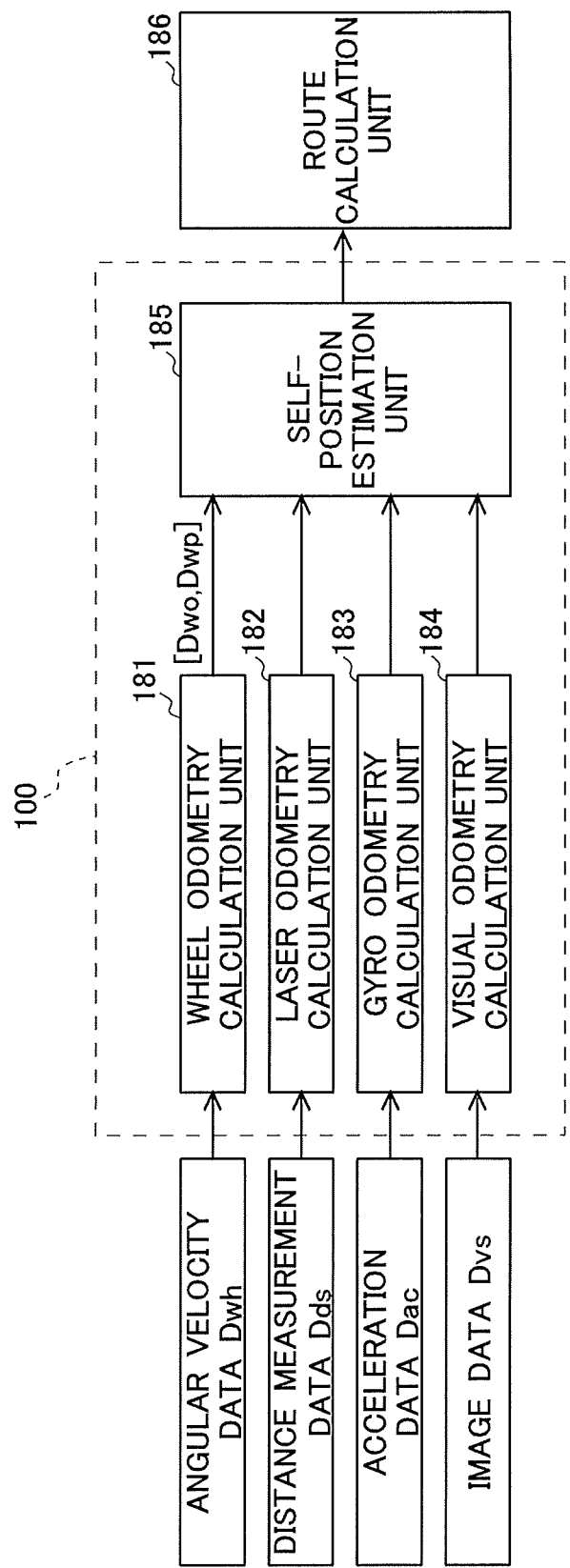
FIG. 4 is a functional block diagram of a position estimation system according to the embodiment.

FIG. 4 is a functional block diagram of the position estimation system according to the embodiment. The position estimation system 100 includes a wheel odometry calculation unit 181, a laser odometry calculation unit 182, a gyro odometry calculation unit 183, and a visual odometry calculation unit 184. The position estimation system 100 further includes a self-position estimation unit 185.

The wheel odometry calculation unit 181 receives angular velocity data Dwh from the rotation sensor 114L, the rotation sensor 114R, and the rotation sensor 114S. The angular velocity data Dwh includes the angular velocity ωL detected by the rotation sensor 114L, the angular velocity ωR detected by the rotation sensor 114R, and the angular velocity ωs detected by the rotation sensor 114S. The wheel odometry calculation unit 181 calculates the velocity Vx in the x-axis direction, the velocity Vy in the y-axis direction, and the angular velocity θs around the turn axis 112 based on the received angular velocity data Dwh using the equations (1) and (2). The wheel odometry calculation unit 181 supplies movement data Dwo, which is a calculation result, to the self-position estimation unit 185.

The wheel odometry calculation unit 181 also supplies reference data Dwp related to the angular velocity ωL, the angular velocity ωR, or the angular velocity ωs to the self-position estimation unit 185. The reference data Dwp includes data related to the angular velocity ωL and the angular velocity ωR. The reference data Dwp may include data related to the angular velocity cos. The position estimation system 100 uses the reference data Dwp to set the priority in the calculation performed by the self-position estimation unit 185.

The laser odometry calculation unit 182 receives distance measurement data Dds from the laser range sensor 16 and calculates a relative position change between the moving apparatus 10 and an object present around the moving apparatus 10 based on the received distance measurement data Dds. The laser odometry calculation unit 182 supplies a calculation result to the self-position estimation unit 185.

The gyro odometry calculation unit 183 receives acceleration data Dac from the gyro sensor 15 and calculates the movement amount and posture change amount of the moving apparatus 10 based on the received acceleration data Dac. The gyro odometry calculation unit 183 supplies a calculation result to the self-position estimation unit 185.

The visual odometry calculation unit 184 receives image data Dvs from the image sensor 13 and calculates a relative position change between the moving apparatus 10 and an object present around the moving apparatus 10 and a posture change of the moving apparatus 10 based on the received image data Dvs. The visual odometry calculation unit 184 supplies a calculation result to the self-position estimation unit 185.

The self-position estimation unit 185 receives the calculation results from the above-described calculation units and integrates the received calculation results to estimate the position of the moving apparatus 10. When the self-position estimation unit 185 integrates the received calculation results, it uses the angular velocity data Dwh received from the wheel odometry calculation unit 181. That is, the self-position estimation unit 185 sets the priority of the data received from the wheel odometry calculation unit 181 according to the values of the angular velocity ωL and the angular velocity ωR. Then, the self-position estimation unit 185 integrates the data received from the respective calculation units based on the set priorities.

The calculation performed by the self-position estimation unit 185 may be, for example, to multiply the values obtained from the plurality of sensors by a coefficient of a preset ratio. An example of such a calculation is to use the Kalman filter. When the Kalman filter is used for the data acquired from the plurality of sensors, the position of the moving apparatus 10 can be estimated highly accurately. Alternatively, the calculation performed by the self-position estimation unit 185 may be to select the data acquired from the plurality of sensors. In this case, the self-position estimation unit 185 acquires data from a reliable sensor as appropriate and estimates the position of the moving apparatus 10. Further alternatively, the calculation performed by the self-position estimation unit 185 may be a combination of the above-described calculations.

Hereinafter, the priority set by the self-position estimation unit 185 will be described using some examples. Firstly, a first example will be described. In the first example, the reference data Dwp includes values of the angular velocity ωL and the angular velocity ωR. The self-position estimation unit 185 compares the reference data Dwp with a preset threshold. When at least one of the value of the angular velocity ωL and the value the angular velocity ωR is larger than the preset threshold, the self-position estimation unit 185 sets the priority as follows. That is, the self-position estimation unit 185 sets the priority of the movement data Dwo calculated based on the angular velocity data Dwh in such a way that it becomes lower than that when both of the values of the angular velocity ωL and the value of the angular velocity ωR are lower than the preset threshold.

Next, a second example will be described. In the second example, the reference data Dwp includes the value of the angular velocity ωL or the value of the angular velocity ωR. The self-position estimation unit 185 receives the reference data Dwp, and when at least one of the value of the angular velocity ωL and the value of the angular velocity ωR is larger than the preset threshold, it integrates the data not including the movement data Dwo calculated based on the angular velocity data Dwh.

Next, a third example will be described. In the third example, the reference data Dwp includes the values of the angular velocity ωL, the angular velocity ωR, and the angular velocity ωs. The self-position estimation unit 185 receives the reference data Dwp and compares the value of the angular velocity ωL and the value of the angular velocity ωR with the value of the angular velocity ωs. For example, the self-position estimation unit 185 calculates a difference between the value of the angular velocity ωL and the value of the angular velocity ωs. Alternatively, the self-position estimation unit 185 excludes the value of the angular velocity ωs from the value of the angular velocity ωL. As a result of such a comparison, the ratio of at least one of the value of the angular velocity ωL and the value of the angular velocity ωR to the value of the angular velocity ωs may become higher than the preset threshold. In such a case, the self-position estimation unit 185 sets the priority of the movement data Dwo calculated based on the angular velocity data Dwh in such a way that it becomes lower than that when both of the ratio of the value of the angular velocity ωL to the value of the angular velocity ωs and the ratio of the value of the angular velocity ωR to the value of the angular velocity ωs are lower than the preset threshold.

Next, a fourth example will be described. In the fourth example, the reference data Dwp includes the values of the angular velocity ωL, the angular velocity ωR, and the angular velocity ωs. The self-position estimation unit 185 receives the reference data Dwp and compares the value of the angular velocity ωL and the value of the angular velocity ωR with the value of the angular velocity ωs. For example, the self-position estimation unit 185 calculates a difference between the value of the angular velocity ωL and the value of the angular velocity ωs. Alternatively, the self-position estimation unit 185 excludes the value of the angular velocity ωs from the value of the angular velocity ωL. As a result of such a comparison, when the ratio of at least one of the value of the angular velocity ωL and the value of the angular velocity ωR to the value of the angular velocity ωs is higher than the preset threshold, the self-position estimation unit 185 integrates the data not including the movement data Dwo calculated based on the angular velocity data Dwh.

Note that the function of the position estimation system 100 described in FIG. 4 can be included in the control apparatus 17. However, some or all of the functions of the position estimation system 100 described in FIG. 4 may be included in the operation apparatus 90. That is, the moving apparatus 10 can transmit the data acquired from each sensor to the operation apparatus 90. Then, the operation apparatus 90 can calculate the data received from the moving apparatus 10 and estimate the position of the moving apparatus 10.

Figure 5:
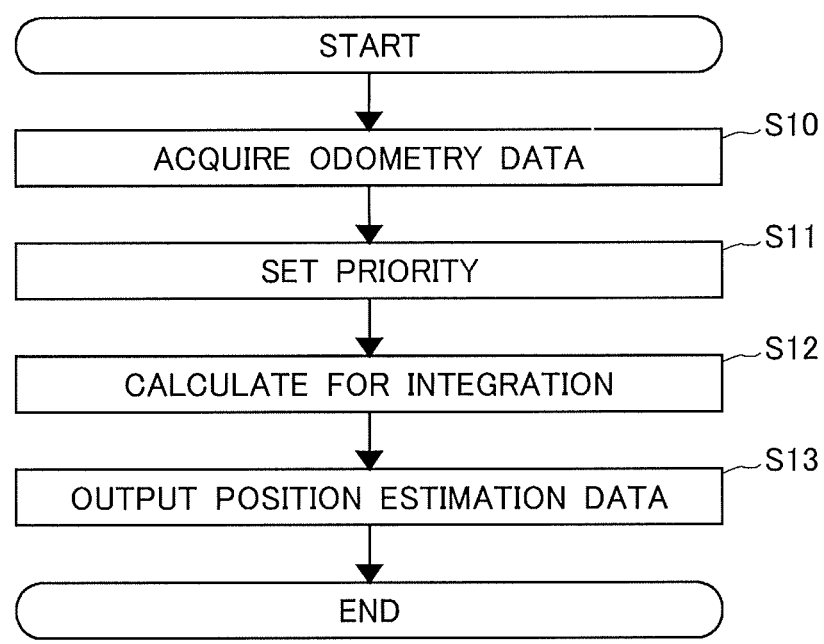
FIG. 5 is a flowchart of the position estimation system according to the embodiment.

Next, processing of the position estimation system 100 will be described with reference to FIG. 5. FIG. 5 is a flowchart of the position estimation system according to the embodiment. The flowchart shown in FIG. 5 shows the processing of the self-position estimation unit 185 shown in FIG. 4.

First, the self-position estimation unit 185 acquires odometry data from each odometry calculation unit (Step S10). That is, in the example of FIG. 4, the self-position estimation unit 185 acquires the movement data Dwo and the reference data Dwp from the wheel odometry calculation unit 181. Further, the self-position estimation unit 185 acquires the odometry data from the laser odometry calculation unit 182, the gyro odometry calculation unit 183, and the visual odometry calculation unit 184.

Next, the self-position estimation unit 185 sets the priority of the movement data Dwo based on the reference data Dwp (Step S11). The processing of setting the priority of the movement data Dwo has been described with reference to FIG. 4.

Next, the self-position estimation unit 185 performs a calculation for integrating the odometry data (Step S12). When such a calculation is performed, the self-position estimation unit 185 performs processing based on the priority of the movement data Dwo set in Step S11.

Next, the self-position estimation unit 185 outputs position estimation data calculated by the integrated calculation of the odometry data to the route calculation unit 186 (Step S13).

With such a configuration, for example, when relatively large slippage is occurring between the driving wheel and the floor surface, the position estimation system can set the priority of the data acquired from this driving wheel relatively low. Thus, this embodiment can provide the position estimation system and the like that effectively prevent accuracy of self-position information from decreasing.

Note that the present disclosure is not limited to the above-described embodiment, and can be appropriately changed without departing from the spirit of the present disclosure. For example, it is not necessary for the moving apparatus 10 to include all of the image sensor 13, the gyro sensor 15, and the laser range sensor 16. That is, the moving apparatus 10 may include any one of the image sensor 13, the gyro sensor 15, and the laser range sensor 16.

Further, the moving apparatus 10 may include, in place of the image sensor 13, the gyro sensor 15, and the laser range sensor 16, a sensor such as a millimeter wave radar for detecting a position change or a posture change of the moving apparatus 10 not according to the angular velocity of the wheel.

Further, it is not necessary for the carriage 11 to include the above-described configuration as long as it includes a driving wheel brought into contact with the floor surface G. The carriage 11 may be or may not be an omniorientation carriage.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A position estimation system comprising:
   one or more first sensors configured to output first data including data of an angular velocity of a wheel driven when a moving apparatus moves;
   a second sensor configured to output second data including position data of the moving apparatus;
   a self-position estimation circuit configured to set a priority of the first data according to a value of the angular velocity of the wheel and integrate the first data with the second data based on the set priority to estimate a position of the moving apparatus; and
   a data output circuit configured to output data related to the estimated position of the moving apparatus,
   wherein when the value of the angular velocity of the wheel included in the first data is larger than a preset threshold, the self-position estimation circuit sets the priority of the first data in such a way that it becomes lower than that when the value of the angular velocity of the wheel is lower than the preset threshold.

2. The position estimation system according to claim 1, wherein the first data is data related to wheel odometry of the moving apparatus.

3. The position estimation system according to claim 1, wherein the self-position estimation circuit integrates the first data with the second data by a Kalman filter.

4. The position estimation system according to claim 1, wherein
   the wheel is a plurality of wheels each rotating independently, and
   the first data comprises the angular velocity of each of the plurality of the wheels.

5. A position estimation system comprising:
   one or more first sensors configured to output first data including data of an angular velocity of a wheel driven when a moving apparatus moves;
   a second sensor configured to output second data including position data of the moving apparatus;
   a self-position estimation circuit configured to set a priority of the first data according to a value of the angular velocity of the wheel and integrate the first data with the second data based on the set priority to estimate a position of the moving apparatus; and
   a data output circuit configured to output data related to the estimated position of the moving apparatus,
   wherein when the value of the angular velocity of the wheel included in the first data is larger than a preset threshold, the self-position estimation circuit estimates the position of the moving apparatus based on the second data.

6. A position estimation system comprising:
   one or more first sensors configured to output first data including data of an angular velocity of a wheel driven when a moving apparatus moves;
   a second sensor configured to output second data including position data of the moving apparatus;
   a self-position estimation circuit configured to set a priority of the first data according to a value of the angular velocity of the wheel and integrate the first data with the second data based on the set priority to estimate a position of the moving apparatus; and
   a data output circuit configured to output data related to the estimated position of the moving apparatus,
   wherein:
   the moving apparatus comprises a turn axis that rotates when the posture of the moving apparatus is changed,
   the first data further includes data of an angular velocity of the turn axis, and
   the self-position estimation circuit compares the value of the angular velocity of the wheel included in the first data with a value of the angular velocity of the turn axis, and
   when a ratio of the value of the angular velocity of the wheel to the value of the angular velocity of the turn axis is higher than a preset threshold, the self-position estimation circuit sets the priority of the first data in such a way that it becomes lower than that when the ratio of the value of the angular velocity of the wheel to the value of the angular velocity of the turn axis is lower than the preset threshold.

7. The position estimation system according to claim 6, wherein
   the moving apparatus comprises an omniorientation moving carriage, and the omniorientation moving carriage comprises the wheel and the turn axis.

\* \* \* \* \*